United States Patent
Zhang et al.

(10) Patent No.: US 7,936,757 B2
(45) Date of Patent: May 3, 2011

(54) PACKET FRAGMENT REASSEMBLY

(75) Inventors: Lida Zhang, Wuhan (CN); Jy Chen, Cupertino, CA (US)

(73) Assignee: O2Micro International Limited, Grand Cayman (KY)

( * ) Notice: Subject to any disclaimer, the term of this patent is extended or adjusted under 35 U.S.C. 154(b) by 0 days.

(21) Appl. No.: 12/395,078

(22) Filed: Feb. 27, 2009

(65) Prior Publication Data

US 2010/0220611 A1  Sep. 2, 2010

(51) Int. Cl.
*H04L 12/28* (2006.01)
*H04L 12/56* (2006.01)
*H04J 3/24* (2006.01)

(52) U.S. Cl. .................... 370/392; 370/473; 370/474

(58) Field of Classification Search .............. None
See application file for complete search history.

(56) References Cited

U.S. PATENT DOCUMENTS

2009/0067431 A1* 3/2009 Huang et al. ............ 370/394
2009/0316698 A1* 12/2009 Menten ..................... 370/392

* cited by examiner

*Primary Examiner* — Gregory B Sefcheck
*Assistant Examiner* — Ashley L Shivers

(57) ABSTRACT

An apparatus for packet fragment reassembly includes a memory and a fragment processing block coupled to the memory. The memory caches information contained in the headers of a plurality of packet fragments, wherein the plurality of packet fragments are identified as belonging to a particular packet. The fragment processing block directly performs operations to each packet fragment according to the information cached in the memory and a predetermined standard, wherein the information cached in the memory is used to track whether all packet fragments associated with the particular packet have been received at the apparatus.

18 Claims, 2 Drawing Sheets

PACKET FRAGMENT REASSEMBLY

BACKGROUND

In a network, Internet Protocol (IP) forwarding equipment, such as routers, L3 (Layer 3, also known as the network layer) switches and L3 gateways, is used to receive an IP packet from a sending host and transfer the IP packet to a receiving host. When a first piece of IP forwarding equipment receives an IP packet larger than the MTU (Maximum Transmission Unit) of the next network segment, IP fragmentation is performed; that is, the IP packet is fragmented into IP fragments by the first piece of IP forwarding equipment. Then, the IP fragments are forwarded by the first piece of IP forwarding equipment to a second piece of IP forwarding equipment, and so on, until they are received by the receiving host. However, usually, the IP fragments are utilized to perform an IP fragment attack, and when an IP fragment attack occurs, the receiving host may crash. Therefore, IP fragment reassembly is required in the IP forwarding equipment to determine if an IP fragment attack is occurring so as to prevent the receiving host from crashing.

One method for IP fragment reassembly commonly used in IP forwarding equipment is to cache each IP fragment and then reassemble the IP fragments that associate with an IP packet. However, caching each IP fragment can consume a large amount of the memory space on the IP forwarding equipment. Thus, the IP forwarding equipment may be susceptible to a denial of service (DOS) attack. Furthermore, caching each IP fragment cannot meet the real-time requirements of some applications, such as a network meeting application or a Voice-over-Internet Protocol (VOIP) application.

SUMMARY

In one embodiment, an apparatus for packet fragment reassembly includes a memory and a fragment processing block coupled to the memory. The memory caches information contained in the header of a plurality of packet fragments, wherein the plurality of packet fragments are identified as belonging to a particular packet. The fragment processing block directly performs operations on each packet fragment according to the information cached in the memory and a predetermined standard, wherein the information cached in the memory is used to track whether all packet fragments associated with the particular packet have been received at the apparatus.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Figure 1:
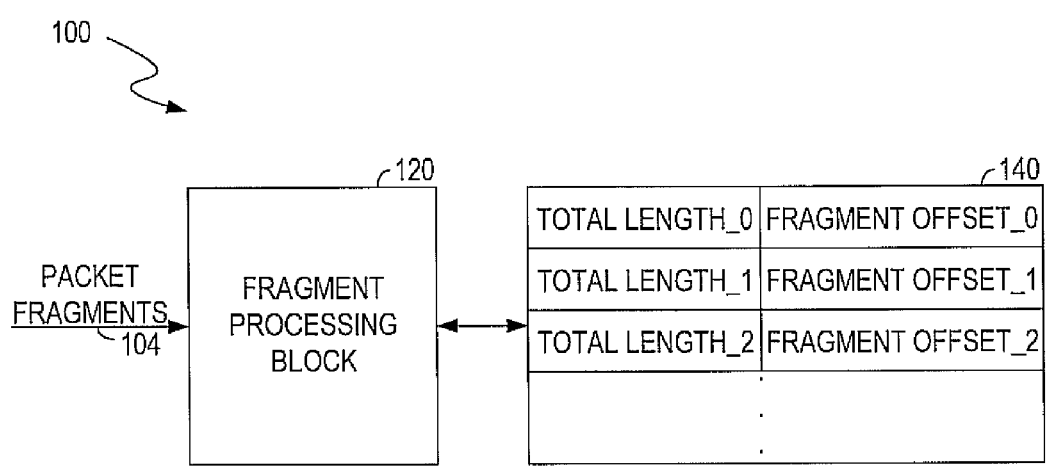
FIG. 1 is a block diagram showing an apparatus for processing packet fragments according to one embodiment of the present invention.

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments. Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "reading," "locating," "comparing," "determining," "forwarding," "dropping," "caching," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments described herein are presented in terms of IP packets and fragments. However, the present invention is not so limited; the features and functionalities presented herein can be utilized with other protocols and packets that behave in a manner similar to that about to be described.

FIG. 1 shows an apparatus 100 for processing IP fragments according to one embodiment of the present invention. The apparatus 100 includes a fragment processing block 120 and a memory 140. In one embodiment, the apparatus 100 can be a type of IP forwarding equipment, such as a router, L3 switch or L3 gateway. In such an embodiment, the apparatus 100 can include other components typically included in IP forwarding equipment, including a processor (microprocessor).

IP fragments 104 are input into the fragment processing block 120; in the example of FIG. 1, the IP fragments 104 may associate with a single IP packet or they may associate with more than one IP packet. Each individual IP fragment can be identified as associating with a particular IP packet in some manner. In one embodiment, information such as the identification, protocol, source address and/or destination address information contained in the header of each IP fragment can be used to identify the IP fragments that associate with the same IP packet; generally speaking, the information used to associate an IP fragment to a particular IP packet will be referred to herein as "packet identifier information." After each IP fragment comes into the fragment processing block 120, the IP fragment is analyzed by the fragment processing block 120, and thus the packet identifier information contained in the header of the IP fragment and other information are known to the IP forwarding equipment.

In one embodiment, a linked list is established in the memory 140 and is used to cache information contained in the headers of the IP fragments 104. Thus, for a plurality of IP fragments 104 that associate with respective IP packets, there are respective linked lists in the memory 140—that is, in one embodiment, there is a linked list for each IP packet.

In one embodiment, total lengths and fragment offsets contained in the headers of the IP fragments 104 are cached in the linked lists in the memory 140. For the subset of the IP fragments 104 that associate with a particular IP packet, there is an associated linked list. In each linked list, the total lengths and fragment offsets are cached according to a predetermined order as described below.

After a new IP fragment comes into the fragment processing block 120, the packet identifier information for the new IP fragment (e.g., the identification, protocol, source address and destination address information included in the header of the new IP packet) is read and used to locate the linked list that is associated with the IP packet that the new IP fragment belongs to.

If the new IP fragment that comes into the fragment processing block 120 is the first IP fragment of the IP packet that the new IP fragment belongs to, a new linked list is established in the memory 140 and the packet identifier information for the new IP fragment is cached in the new linked list, in one embodiment.

As mentioned above, the total lengths and the fragment offsets are cached in each linked list according to a predetermined order. In one embodiment, the predetermined order is determined by the values of the fragment offsets. That is, the order proceeds from the minimum fragment offset to the maximum fragment offset, or from the maximum fragment offset to the minimum fragment offset; in other words, the total lengths and fragment offsets are cached in an order that corresponds to the magnitude of the fragment offsets, from highest to lowest or from lowest to highest.

In the example of FIG. 1, total length_0, fragment offset_0, total length_1, fragment offset_1, total length_2, and fragment offset_2 in the linked list of the memory 140 respectively correspond to three IP fragments associated with the same IP packet. The fragment offset_0, the fragment offset_1 and the fragment offset_2 are cached from the minimum fragment offset to the maximum fragment offset or from the maximum fragment offset to the minimum fragment offset. Thus, after a new IP fragment comes into the fragment processing block 120 and the associated linked list is located as described above, the fragment processing block 120 compares the fragment offset contained in the header of the new IP fragment with the fragment offsets in the linked list to find a caching position. The purpose of finding the caching position is to cache the total length and the fragment offset of the new IP fragment in the predetermined order.

The new IP fragment is itself not cached in the memory 140 for the IP fragment reassembly. Instead, according to a predetermined standard as described below, the fragment processing block 120 directly performs operations on the new IP fragment.

In one embodiment, the predetermined standard is to drop the new IP fragment if an IP fragment overlap is occurring, and to otherwise forward the new IP fragment and cache the total length and the fragment offset contained in the header of the new IP fragment in the caching position. More specifically, in one embodiment, if all of the data in the new IP fragment is also included in another IP fragment that arrived into the fragment processing block 120 earlier than the new IP fragment, then the fragment processing block 120 concludes that "IP fragment full overlap" is occurring, in which case the new IP fragment is dropped and the total length and the fragment offset contained in the header of the new IP fragment is not cached. If only some of the data in the new IP fragment is also included in the IP fragments that arrived into the fragment processing block 120 earlier than the new IP fragment, then the fragment processing block 120 concludes that "IP fragment partial overlap" is occurring, in which case only the data not included in the preceding IP fragment is forwarded and the total length and the fragment offset contained in the header of the new IP fragment is accordingly reduced and then cached, in one embodiment.

In another embodiment, the predetermined standard is to drop the new IP fragment if an IP fragment attack (a denial of service attack) is occurring, and to otherwise forward the new IP fragment and cache the total length and the fragment offset contained in the header of the new IP fragment in the caching position. Any of a variety of known mechanisms can be employed to determine if an IP fragment attack is occurring.

In one embodiment, a decision whether to cache the total length and the fragment offset contained in the header of the new IP fragment in the caching position is made by determining if the new IP fragment is the last fragment of the IP packet that the new IP fragment associates with. In other words, before the total length and the fragment offset of the new IP fragment is cached in the caching position, the fragment processing block 120 can determine if all of the IP fragments that associate with an IP packet have been received. In one embodiment, if the new IP fragment is the last fragment of the IP packet that the new IP fragment associates with, the total length and the fragment offset of the new IP fragment are not cached in the caching position in the associated linked list and the associated linked list can be deleted from the memory 140.

After the new IP fragment comes into the fragment processing block 120 and the associated linked list is located as described above, the total length and the fragment offset contained in the header of the new IP fragment, and the total lengths and fragment offsets cached in the linked list, can be used in an algorithm to determine if an "IP fragment full overlap" is occurring, if an "IP fragment partial overlap" is occurring, if an IP fragment attack is occurring, and/or if all of the IP fragments that belong to an IP packet have been received by the fragment processing block 120.

In one embodiment, in addition to the total length and the fragment offset, other information contained in the header of the IP fragment (such as Don't Fragment (DF) and More Fragment (MF)) can be cached in the linked list.

Thus, after each IP fragment comes into the fragment processing block 120, the IP fragment is not cached, and can be directly forwarded or dropped as described above. As a result, only a relatively small part of the memory space of the IP forwarding equipment is utilized, thereby reducing the susceptibility of the IP forwarding equipment to a DOS attack. Furthermore, real-time requirements can be met.

Figure 2:
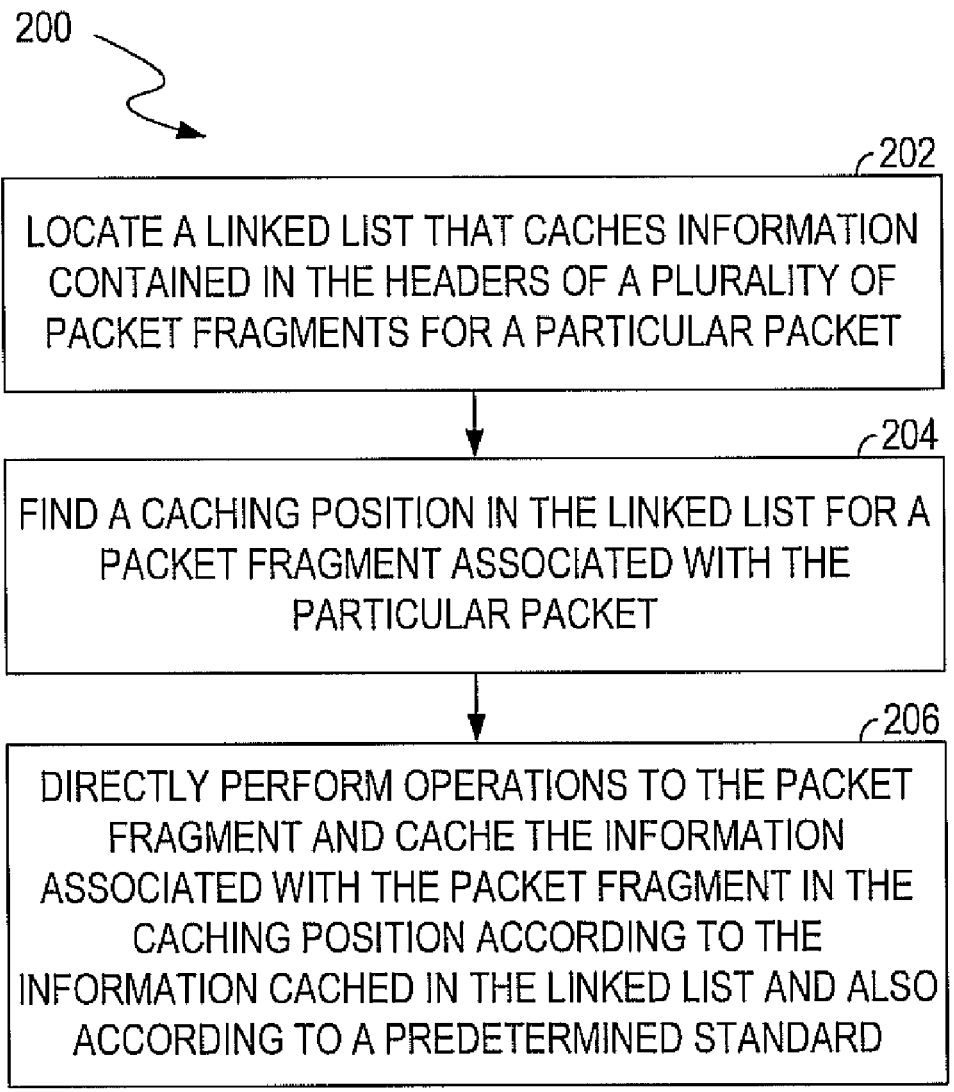
FIG. 2 is a diagram showing a computer-implemented method for processing packet fragments according to one embodiment of the present invention.

Referring to FIG. 2, a method 200 for processing IP fragment according to one embodiment of the present invention is illustrated. FIG. 2 is described in combination with FIG. 1. At 202, after a new IP fragment for a particular IP packet comes into a fragment processing block 120, an associated linked list is located if one already exists; if the new IP fragment is the first fragment for the particular IP packet, then a linked list for the IP packet is created. Some information, such as the total length and the fragment offset, contained in the headers of the IP fragments that belong to an IP packet is cached in a linked list for that IP packet in the memory 140. In one embodiment, packet identifier information, such as but not limited to identification, protocol, source address and destination address information contained in the header of the new IP fragment, is read and used to locate the associated linked list.

At 204, a caching position is found in the linked list for the new IP fragment. In one embodiment, the total lengths and fragment offsets are cached in the linked lists according to a predetermined order. In one embodiment, the predetermined order is determined by the value of the fragment offsets as described above. After the new IP fragment comes into the fragment processing block 120 and the associated linked list is located, the fragment offset of the new IP fragment is compared to the fragment offsets in the associated linked list to find the caching position.

At 206, operations are directly performed on the new IP fragment, and the information associated with the new IP fragment are cached in the caching position according to the information in the linked list and a predetermined standard. In one embodiment, the predetermined standard is to drop the new IP fragment if IP fragment overlap is occurring, and to otherwise forward the new IP fragment and cache the total length and the fragment offset contained in the header of the new IP fragment in the caching position as described above. In another embodiment, the predetermined standard is to drop the new IP fragment if an IP fragment attack is occurring, and to otherwise forward the new IP fragment and cache the total length and the fragment offset contained in the header of the new IP fragment in the caching position as described above. In one embodiment, before the total length and the fragment offset contained in the header of the new IP fragment are cached in the caching position, a determination is made whether all of the IP fragments that associate with an IP packet have been received by the fragment processing block 120 as described above. In one embodiment, the total lengths and fragment offsets cached in the linked list, and the total length and the fragment offset contained in the header of the new IP fragment, can be used to determine, for example, if IP fragment overlap is occurring, if an IP fragment attack is occurring, and if all of the IP fragments that associate with an IP packet have been received by the fragment processing block 120.

To summarize, in a conventional application, after each IP fragment comes into the IP forwarding equipment, it is cached in the memory of IP forwarding equipment; after all of the IP fragments that belong to an IP packet are cached, the IP forwarding equipment reassembles these IP fragments. In contrast, according to embodiments of the present invention, each IP fragment is not cached and operations can be directly performed on each IP fragment (such as forwarding or dropping each IP fragment) according to a predetermined standard. Only some information contained in the header of the IP fragment is cached in order to decide which operation is performed on each IP fragment according to the predetermined standard. In essence, the header information that is cached is used to determine whether all of the fragments associated with a particular IP packet have been received—the length and offset information can be used to account for which of the IP fragments associated with the particular IP packet have been received. If there is a gap in the linked list for a particular packet, then all of the fragments for that packet have not yet been received; and if the linked list is completely filled in, so to speak, then all of the fragments for that packet have been received. In a sense, an IP packet is figuratively or virtually reassembled using the length and offset information but is not actually reassembled in the conventional manner. Accordingly, relative to conventional techniques, only a relatively small part of the memory space of the IP forwarding equipment is utilized, thereby reducing the susceptibility of the IP forwarding equipment to a DOS attack.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. An apparatus for processing packet fragments, said apparatus comprising:
   a memory operable for caching information included in headers of a plurality of packet fragments, wherein said packet fragments are each identified as associated with a particular packet; and a fragment processing block coupled to said memory and operable for performing operations on each of said packet fragments according to said information instead of caching a first packet fragment before performing said operations, wherein said information cached in said memory is useful for determining whether said first packet fragment of said packet fragments partially overlaps a second packet fragment of said packet fragments, wherein if said first packet fragment partially overlaps but does not fully overlap said second packet fragment then data included in said first packet fragment but not in said second packet fragment is forwarded from said apparatus, wherein said information comprises total lengths and fragment offsets included in said headers of said plurality of packet fragments, and wherein said length and offset for said first packet fragment are reduced according to the amount of said data included in said first packet fragment but not included in said second packet fragment.

2. The apparatus of claim 1, wherein said information is cached according to a predetermined order.

3. The apparatus of claim 2, wherein said predetermined order is from the minimum of said fragment offsets to the maximum of said fragment offsets.

4. The apparatus of claim 2, wherein said predetermined order is from the maximum of said fragment offsets to the minimum of said fragment offsets.

5. The apparatus of claim 1, wherein said apparatus comprises forwarding equipment for forwarding said packet fragments.

6. The apparatus of claim 5, wherein said forwarding equipment is selected from the group consisting of a router, Layer 3 (L3) switch and L3 gateway.

7. The apparatus of claim 1, wherein said first packet fragment is dropped if said first packet fragment fully overlaps said second packet fragment.

8. The apparatus of claim 1, wherein said first packet fragment is dropped if said first packet fragment is identified as part of an attack.

9. A computer-implemented method for processing packet fragments, said method comprising:

locating a linked list that caches, in computer system memory, information contained in the headers of a plurality of packet fragments for a particular packet;

finding a caching position in said linked list for a first packet fragment associated with said particular packet; and performing operations on said first packet fragment before caching said information associated with said first packet fragment at said caching position according to said information cached in said linked list, wherein said operations comprise determining whether said first packet fragment of said packet fragments partially overlaps a second packet fragment of said packet fragments, wherein if said first packet fragment partially overlaps but does not fully overlap said second packet fragment then data included in said first packet fragment but not in said second packet fragment is forwarded from said apparatus, wherein said information comprises total lengths and fragment offsets included in said headers of said plurality of packet fragments, and wherein said length and offset for said first packet fragment are reduced according to the amount of said data included in said first packet fragment but not included in said second packet fragment.

10. The method of claim 9, wherein said caching position is determined by a predetermined order.

11. The method of claim 10, wherein said predetermined order is from the minimum of said fragment offsets to the maximum of said fragment offsets.

12. The method of claim 10, wherein said predetermined order is from the maximum of said fragment offset to the minimum of said fragment offsets.

13. The method of claim 9, wherein said first packet fragment is dropped if said first packet fragment totally overlaps said second packet fragment.

14. The method of claim 9, wherein said first packet fragment is dropped if said first packet fragment is identified as part of an attack.

15. A non-transitory computer-readable medium having computer-executable instructions for performing a method for processing packet fragments, said method comprising:

locating a linked list that caches, in computer system memory, information contained in the headers of a plurality of packet fragments for a particular packet;

finding a caching position in said linked list for a first packet fragment associated with said particular packet; and performing operations on said first packet fragment before caching said information associated with said first packet fragment in said caching position according to said information cached in said linked list, wherein said operations comprise determining whether said first packet fragment of said packet fragments partially overlaps a second packet fragment of said packet fragments, wherein if said first packet fragment partially overlaps but does not fully overlap said second packet fragment then data included in said first packet fragment but not in said second packet fragment is forwarded from said apparatus, wherein said information comprises total lengths and fragment offsets included in said headers of said plurality of packet fragments, and wherein said length and offset for said first packet fragment are reduced according to the amount of said data included in said first packet fragment but not included in said second packet fragment.

16. The non-transitory computer-readable medium of claim 15, wherein said caching position is determined by a predetermined order which is determined by magnitudes of said fragment offsets.

17. The non-transitory computer-readable medium of claim 15, wherein said first packet fragment is dropped if said first packet fragment fully overlaps said second packet fragment.

18. The non-transitory computer-readable medium of claim 15, wherein said first packet fragment is dropped if said first packet fragment is part of an attack.

* * * * *